(12) United States Patent
Koga et al.

(10) Patent No.: US 10,393,495 B2
(45) Date of Patent: Aug. 27, 2019

(54) MEASURING PROBE

(71) Applicant: MITUTOYO CORPORATION, Kanagawa (JP)

(72) Inventors: Satoshi Koga, Ibaraki (JP); Akinori Saito, Ibaraki (JP); Hiroyuki Kanamori, Ibaraki (JP); Yutaka Kuriyama, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 277 days.

(21) Appl. No.: 15/440,440

(22) Filed: Feb. 23, 2017

(65) Prior Publication Data

US 2017/0248400 A1  Aug. 31, 2017

(30) Foreign Application Priority Data

Feb. 26, 2016 (JP) .................................. 2016-036472

(51) Int. Cl.
*G01B 5/30* (2006.01)
*G01B 7/00* (2006.01)
(Continued)

(52) U.S. Cl.
CPC ............... *G01B 5/30* (2013.01); *G01B 5/016* (2013.01); *G01B 7/001* (2013.01); *G01B 7/012* (2013.01)

(58) Field of Classification Search
CPC .......... G01B 5/30; G01B 5/016; G01B 7/001; G01B 7/012
(Continued)

(56) References Cited

U.S. PATENT DOCUMENTS 4,158,919 A * 6/1979 McMurtry ............. G01B 7/012
33/505
4,316,329 A * 2/1982 Watson ................... B23Q 1/36
33/644
(Continued)

FOREIGN PATENT DOCUMENTS

DE     101 22 200    11/2002
JP     4-178509      6/1992
(Continued)

OTHER PUBLICATIONS

Official Action, along with English-language translation thereof, issued in JP Appl. No. 2016-036473 dated Jul. 4, 2017.
(Continued)

Primary Examiner — Justin Seo
Assistant Examiner — Tania C Courson
(74) *Attorney, Agent, or Firm* — Greenblum & Bernstein, P.L.C.

(57) ABSTRACT

A measuring probe includes: a stylus having a contact part to be brought into contact with an object to be measured; a probe housing capable of supporting the stylus on an axial center; and a detection element capable of detecting a movement of the contact part. The measuring probe further includes: two supporting members disposed in an axial direction of the probe housing, the supporting member allowing for an attitude change of the stylus; and a coupling shaft for coupling the two supporting members together. The detection element is disposed in one of the two supporting members that is farthest away from a rotational center position of rotation generated in the stylus when a measuring force is applied to the contact part from a direction perpendicular to the axial direction, to detect a strain amount of the one of the two supporting members.

19 Claims, 7 Drawing Sheets

(51) Int. Cl.
  *G01B 5/016* (2006.01)
  *G01B 7/012* (2006.01)

(58) Field of Classification Search
  USPC .................. 33/502–503, 550–551, 553–554
  See application file for complete search history.

(56) References Cited

U.S. PATENT DOCUMENTS

| | | | | |
|---|---|---|---|---|
| 4,866,854 | A * | 9/1989 | Seltzer | B23P 19/105 |
| | | | | 33/558 |
| 4,942,671 | A * | 7/1990 | Enderle | G01B 11/007 |
| | | | | 33/556 |
| 5,024,003 | A * | 6/1991 | Breyer | G01B 7/002 |
| | | | | 33/556 |
| 5,210,410 | A * | 5/1993 | Barrett | B82Y 35/00 |
| | | | | 250/234 |
| 5,228,352 | A * | 7/1993 | McMurtry | G01B 11/007 |
| | | | | 33/558 |
| 5,345,689 | A | 9/1994 | McMurtry et al. | |
| 5,509,211 | A | 4/1996 | Ernst | |
| 5,755,038 | A | 5/1998 | McMurtry | |
| 6,044,569 | A * | 4/2000 | Ogihara | G01B 21/045 |
| | | | | 33/503 |
| RE37,030 | E * | 1/2001 | Lloyd | G01B 7/002 |
| | | | | 33/559 |
| 6,327,789 | B1 * | 12/2001 | Nishimura | G01B 7/002 |
| | | | | 33/558 |
| 6,457,366 | B1 * | 10/2002 | Hidaka | G01B 5/012 |
| | | | | 73/634 |
| 6,516,669 | B2 * | 2/2003 | Matsuki | B23Q 17/20 |
| | | | | 33/503 |
| 6,675,637 | B2 * | 1/2004 | Saito | B82Y 35/00 |
| | | | | 73/104 |
| 6,789,327 | B2 * | 9/2004 | Roth | G01B 7/012 |
| | | | | 33/556 |
| 6,812,850 | B2 * | 11/2004 | Matsumiya | F16P 7/00 |
| | | | | 33/558 |
| 6,848,315 | B2 * | 2/2005 | Matsuki | G01D 5/2086 |
| | | | | 33/503 |
| 7,076,883 | B2 * | 7/2006 | Yamamoto | F16F 7/10 |
| | | | | 33/556 |
| 7,367,132 | B2 * | 5/2008 | Mitsuhashi | G01B 7/001 |
| | | | | 33/556 |
| 7,490,411 | B2 * | 2/2009 | Matsumiya | G01B 5/204 |
| | | | | 33/199 R |
| 7,591,078 | B2 * | 9/2009 | Crampton | B25J 13/088 |
| | | | | 33/503 |
| 7,603,789 | B2 * | 10/2009 | Hellier | G01B 7/012 |
| | | | | 33/561 |
| 7,748,136 | B2 * | 7/2010 | Joo | B23P 19/105 |
| | | | | 33/520 |
| 7,784,333 | B2 * | 8/2010 | Nemoto | G01B 3/008 |
| | | | | 33/503 |
| 7,958,564 | B2 | 6/2011 | Noda et al. | |
| 9,046,335 | B2 * | 6/2015 | Fuchs | G01B 5/008 |
| 9,395,181 | B2 * | 7/2016 | Omori | G01B 21/20 |
| 9,423,232 | B2 * | 8/2016 | Dall'Aglio | G01B 5/016 |
| 9,500,533 | B2 * | 11/2016 | Moersch | G01B 21/04 |
| 9,528,824 | B2 * | 12/2016 | Bos | G01B 21/04 |
| 9,734,609 | B2 * | 8/2017 | Pulla | G01B 21/04 |
| 9,791,262 | B2 * | 10/2017 | Harsila | G01B 1/00 |
| 9,989,348 | B2 * | 6/2018 | Desforges | B25J 9/1692 |
| 10,145,666 | B2 * | 12/2018 | Jansson | G01B 5/016 |
| 10,154,822 | B2 * | 12/2018 | Henderson | A61B 6/0457 |
| 2004/0118000 | A1 | 6/2004 | Roth et al. | |
| 2009/0217426 | A1 | 8/2009 | Noda et al. | |
| 2013/0111773 | A1 * | 5/2013 | Fuchs | G01B 5/008 |
| | | | | 33/503 |
| 2016/0258744 | A1 * | 9/2016 | Shimaoka | G01B 11/14 |

FOREIGN PATENT DOCUMENTS

| | | |
|---|---|---|
| JP | 5-332766 | 12/1993 |
| JP | H09-507918 A | 8/1997 |
| JP | 10-288502 | 10/1998 |
| JP | 2003-50118 | 2/2003 |
| JP | 2005-181293 | 7/2005 |
| JP | 2007-40822 | 2/2007 |
| JP | 3140476 | 3/2008 |
| JP | 2009-198303 | 9/2009 |
| JP | 2014-115105 | 6/2014 |
| WO | WO96/16312 A | 5/1996 |

OTHER PUBLICATIONS

Official Action, along with English-language translation thereof, issued in JP Appl. No. 2016-036472 dated Jul. 11, 2017.
Extended European Search Report in EP Appl. No. 17157601.0 dated Apr. 24, 2017.
Extended European Search Report in EP Appl. No. 17157600.2 dated Apr. 24, 2017.
U.S. Appl. No. 15/440,280 to Satoshi Koga et al., which was filed Feb. 23, 2017.

* cited by examiner

FIG.6A
FIG.6B
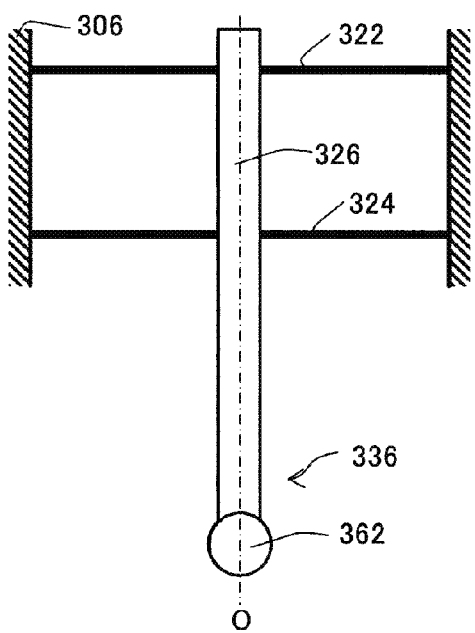
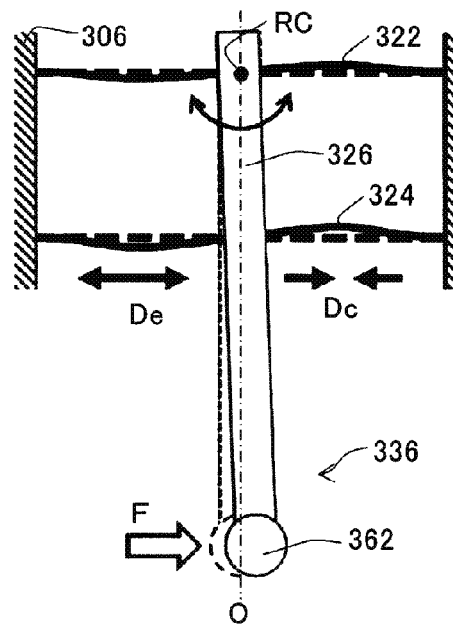

MEASURING PROBE

CROSS-REFERENCE TO RELATED APPLICATION

The disclosure of Japanese Patent Application No. 2016-36472 filed on Feb. 26, 2016 including specifications, drawings and claims is incorporated herein by reference in its entirety.

TECHNICAL FIELD

The present invention relates to a measuring probe, and in particular to a measuring probe having a simple structure and capable of ensuring high measurement sensitivity.

BACKGROUND ART

Coordinate measuring machines, for example, have been known as measuring apparatus that are brought into contact with a surface of an object to be measured to measure the shape of the surface of the object to be measured. Such a coordinate measuring machine employs a measuring probe that is brought into contact with an object to be measured to detect the surface shape thereof (Japanese Patent Application Laid-Open No. Hei. 10-288502; hereinafter referred to as Patent Literature 1). The measuring probe described in Patent Literature 1 includes: a stylus having a contact part to be in contact with (a surface of) an object to be measured; and detection elements capable of detecting a movement of the contact part. In Patent Literature 1, the detection elements are fixed to a detection element supporting part formed in the stylus. On the basis of outputs generated by strains in the detection elements due to the deformation of the detection element supporting part, a touch signal (contact sensed signal) is outputted. In other words, Patent Literature 1 implements the measuring probe with the simple structure.

SUMMARY OF INVENTION

Technical Problem

In Patent Literature 1, however, a low measuring force results in a small deformation amount of the detection element supporting part due to high stiffness of the detection element supporting part. Thus, there is a possibility of having difficulty in obtaining sufficient outputs from the detection elements.

The present invention has been made in order to solve the above-described problem in the conventional technique, and an object thereof is to provide a measuring probe having a simple structure and capable of ensuring high measurement sensitivity.

Solution to Problem

To solve the above-described problem, a first aspect of the present invention provides a measuring probe including: a stylus having a contact part to be brought into contact with an object to be measured; a probe housing capable of supporting the stylus on an axial center; and a detection element capable of detecting a movement of the contact part. The measuring probe further includes: a plurality of supporting members disposed in an axial direction of the probe housing, the supporting members allowing for an attitude change of the stylus; and a coupling shaft configured to couple the plurality of supporting members together. The detection element is disposed in, among the plurality of supporting members, a supporting member that is farthest away from a rotational center position of rotation generated in the stylus when a measuring force is applied to the contact part from a direction perpendicular to the axial direction, to detect a strain amount of the supporting member.

A second aspect of the present invention provides the above-described measuring probe, wherein the stylus is configured to be displaceable integrally with the coupling shaft with respect to the probe housing.

A third aspect of the present invention provides the above-described measuring probe, wherein the stylus is configured to be displaceable integrally with the probe housing with respect to the coupling shaft.

A fourth aspect of the present invention provides the above-described measuring probe, wherein stiffness of the measuring probe in the axial direction and stiffness of the measuring probe in the direction perpendicular to the axial direction are made identical with each other.

A fifth aspect of the present invention provides the above-described measuring probe, wherein stiffness of the supporting member that is farthest away from the rotational center position is set lower than stiffness of the remaining supporting member.

A sixth aspect of the present invention provides the above-described measuring probe, wherein stiffness of a member supported by the plurality of supporting members and integrally having the contact part on a tip thereof is set higher than the stiffness of the supporting member that is farthest away from the rotational center position, in the direction perpendicular to the axial direction.

A seventh aspect of the present invention provides the above-described measuring probe, wherein the supporting member that is farthest away from the rotational center position among the plurality of supporting members is disposed closest to the contact part.

An eighth aspect of the present invention provides the above-described measuring probe, wherein the plurality of supporting members each have a rotationally symmetric shape including three or more deformable arm parts, and the three or more arm parts are formed on the same plane.

A ninth aspect of the present invention provides the above-described measuring probe, wherein among the plurality of supporting members, at least a supporting member that supports the detection element is configured to include the arm parts in a multiple of four.

A tenth aspect of the present invention provides the above-described measuring probe, wherein the supporting member includes, in addition to the arm part, a central part connected to the coupling shaft, and a peripheral part coupled to the central part with the arm part and connected to the probe housing, and the detection element is disposed on a side of the peripheral part with respect to a center of the arm part.

An eleventh aspect of the present invention provides the above-described measuring probe, wherein the arm part further includes, on the side of the peripheral part, a narrowed portion having a width smaller than a width on a side of the central part.

A twelfth aspect of the present invention provides the above-described measuring probe, wherein a terminal part of the detection element is disposed closer to the center of the arm part than a detection part of the detection element.

A thirteenth aspect of the present invention provides the above-described measuring probe, wherein a signal processing circuit for processing an output of the detection element is disposed on a side opposite to the stylus with respect to all of the plurality of supporting members.

A fourteenth aspect of the present invention provides the above-described measuring probe including an over-travel mechanism for changing a position of the stylus when a force larger than a predetermined measuring force is applied to the stylus and restoring the position of the stylus automatically when the large force disappears, the over-travel mechanism being provided between the plurality of supporting members and the stylus in the axial direction.

A fifteenth aspect of the present invention provides the above-described measuring probe, wherein facing parts that face the both surfaces of at least one supporting member among the plurality of supporting members are provided integrally with the probe housing.

A sixteenth aspect of the present invention provides the above-described measuring probe, wherein any of a viscous material and an elastic material is filled in at least part of a gap between a wall member that is positioned on a side closer to the stylus with respect to all of the plurality of supporting members, formed integrally with the probe housing, and disposed so as to face a member for supporting the contact part and the member for supporting the contact part.

A seventeenth aspect of the present invention provides the above-described measuring probe, wherein the detection element is disposed in each of two or more of the supporting members.

An eighteenth aspect of the present invention provides the above-described measuring probe, wherein the detection element is a strain gauge.

According to the present invention, the measuring probe having the simple structure but capable of ensuring high measurement sensitivity can be obtained.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein;

FIG. 6A is a schematic diagram illustrating a relationship between two supporting members in the measuring probe of FIG. 2 under the absence of a measuring force, and FIG. 6B is a schematic diagram illustrating a relationship between the two supporting members in the measuring probe of FIG. 2 under the presence of a measuring force in a direction perpendicular to an axial direction;

DESCRIPTION OF EMBODIMENTS

An example of an embodiment of the present invention will be described below in detail with reference to the drawings.

The first embodiment of a measuring system of the present invention will be described with reference to FIGS. 1 to 6B.

The general configuration of a measuring system 100 will be described first.

Figure 1:
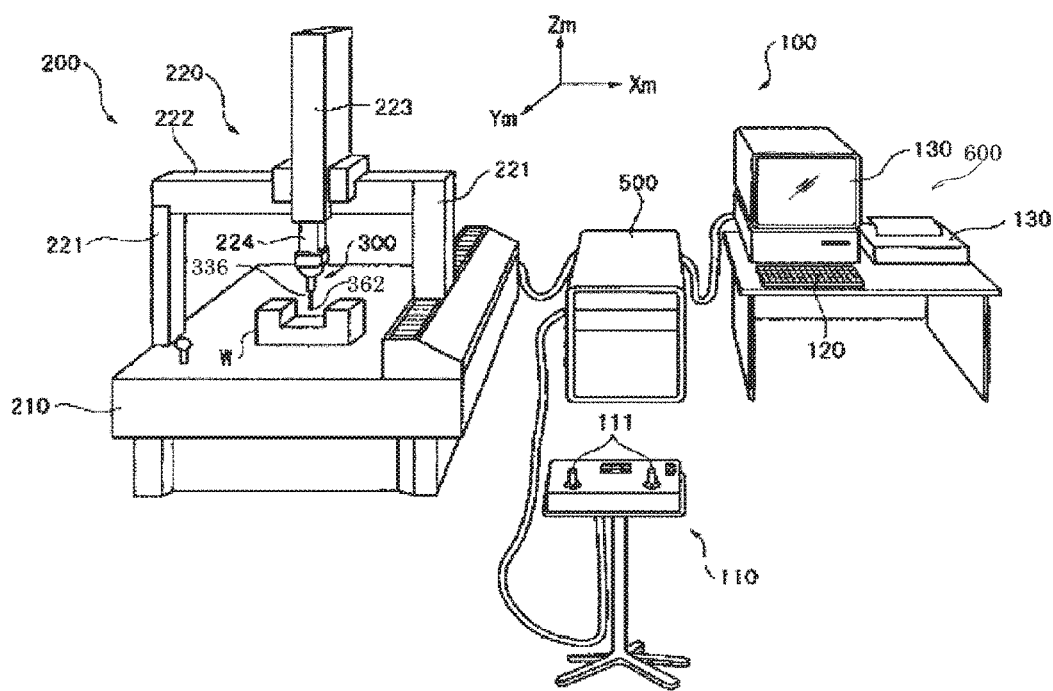
FIG. 1 is a schematic diagram illustrating an example of a measuring system using a measuring probe according to a first embodiment of the present invention.

As illustrated in FIG. 1, the measuring system 100 includes: a coordinate measuring machine 200 that moves a measuring probe 300; an operating part 110 having manually-operated joysticks 111; and a motion controller 500 that controls operations of the coordinate measuring machine 200. The measuring system 100 also includes: a host computer 600 that operates the coordinate measuring machine 200 via the motion controller 500 and processes measured data obtained by the coordinate measuring machine 200 to determine, for example, the dimensions and shape of an object W to be measured; input unit 120 for inputting, for example, measurement conditions; and output unit 130 for outputting a result of measurement.

As illustrated in FIG. 1, the coordinate measuring machine 200 includes: the measuring probe 300; a surface plate 210; a drive mechanism 220 provided to stand on the surface plate 210, for three-dimensionally moving the measuring probe 300; and a drive sensor that detects a drive amount of the drive mechanism 220.

The general configuration of the measuring probe 300 will be described next.

Figure 2:
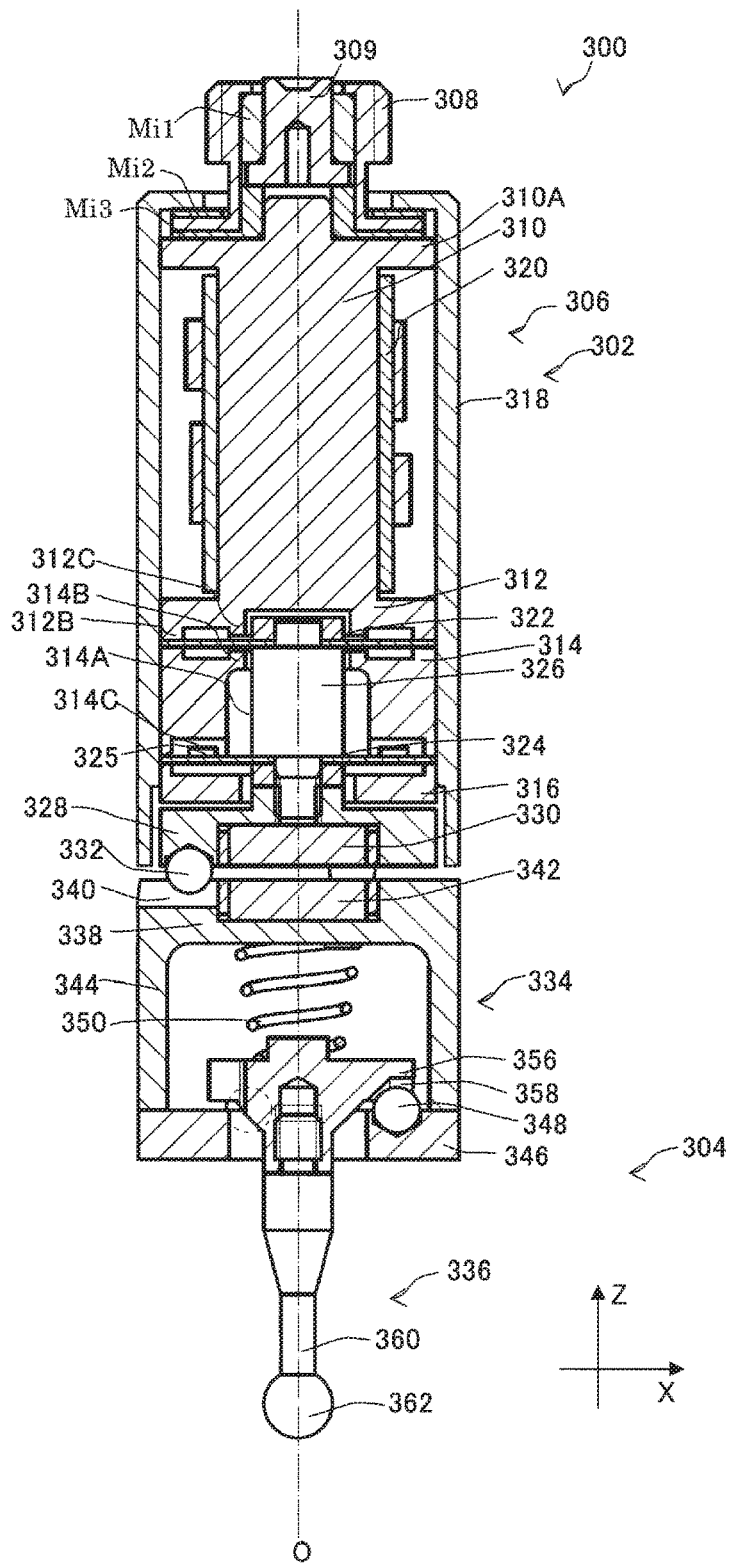
FIG. 2 is a schematic diagram illustrating a cross section of the measuring probe of FIG. 1.

As illustrated in FIG. 2, the measuring probe 300 includes: a stylus 336 having a contact part 362 to be brought into contact with the object W to be measured; a probe housing 306 capable of supporting the stylus 336 on an axial center O; and detection elements 325 capable of detecting a movement of the contact part 362 from the axial center O and a movement of the contact part 362 on the axial center O. Note that the stylus 336 is included in a stylus module 304, and the probe housing 306 and the detection elements 325 are included in a probe main body 302. The probe main body 302 is supported by a spindle 224 of the drive mechanism 220. The stylus module 304 is coupled to the probe main body 302 with a kinematic joint (to be described later) in such a manner that the stylus module 304 can be detached from and attached to the probe main body 302 with high positional reproducibility.

The measuring probe 300 will be described below in detail. Note that the longitudinal direction on the plane of paper in FIG. 2 is defined as a Z direction, the horizontal direction on the plane of paper is defined as an X direction, and the direction perpendicular to the plane of paper is defined as a Y direction for the purpose of the following description. Therefore, the direction of the axial center O of the measuring probe 300 (axial direction O) coincides with the Z direction.

As illustrated in FIG. 2, the probe main body 302 includes the probe housing 306, a signal processing circuit 320, supporting members 322 and 324, the detection elements 325, a coupling shaft 326, a flange member 328, a permanent magnet 330, and balls 332.

As illustrated in FIG. 2, the probe housing 306 includes an attachment part 308, a circuit placement part 310, a fixing member 314, a bottom member (wall member) 316, and a main body cover 318.

As illustrated in FIG. 2, the attachment part 308 is a part to be attached to the spindle 224 at the upper end of the measuring probe 300. The attachment part 308 is provided with, for example, a head to be inserted into a fitting part provided in the spindle 224. The attachment part 308 serves also as one connection terminal capable of electrically connecting to the motion controller 500. The other connection terminal 309 is provided on the axial center O of the attachment part 308. The attachment part 308 and the connection terminal 309 are connected to the signal processing circuit 320 disposed in the circuit placement part 310 without developing a short circuit with each other by insulating members Mi1 to Mi3. The circuit placement part 310 is disposed at the lower end of the attachment part 308. The circuit placement part 310 has a generally triangular cross section, which is perpendicular to the axial center O, except for a disk-shaped upper end part 310A and a disk-shaped lower flange 312 provided at the lower end thereof. The signal processing circuit 320 is disposed along the generally triangular outer periphery of the circuit placement part 310. The circuit placement part 310 is disposed above the supporting members 322 and 324. In other words, the circuit placement part 310 is disposed on the side opposite to the stylus module 304 with respect to the supporting members 322 and 324 (i.e., the signal processing circuit 320 is disposed on the side opposite to the stylus 336 with respect to all of the supporting members 322 and 324). This eliminates a need to provide a cavity inside the circuit placement part 310. Thus, the circuit placement part 310 can be shaped with high stiffness. The circuit placement part 310 can be formed from a low-expansion material in order to reduce expansion and contraction due to heat generated from the signal processing circuit 320.

Figure 3:
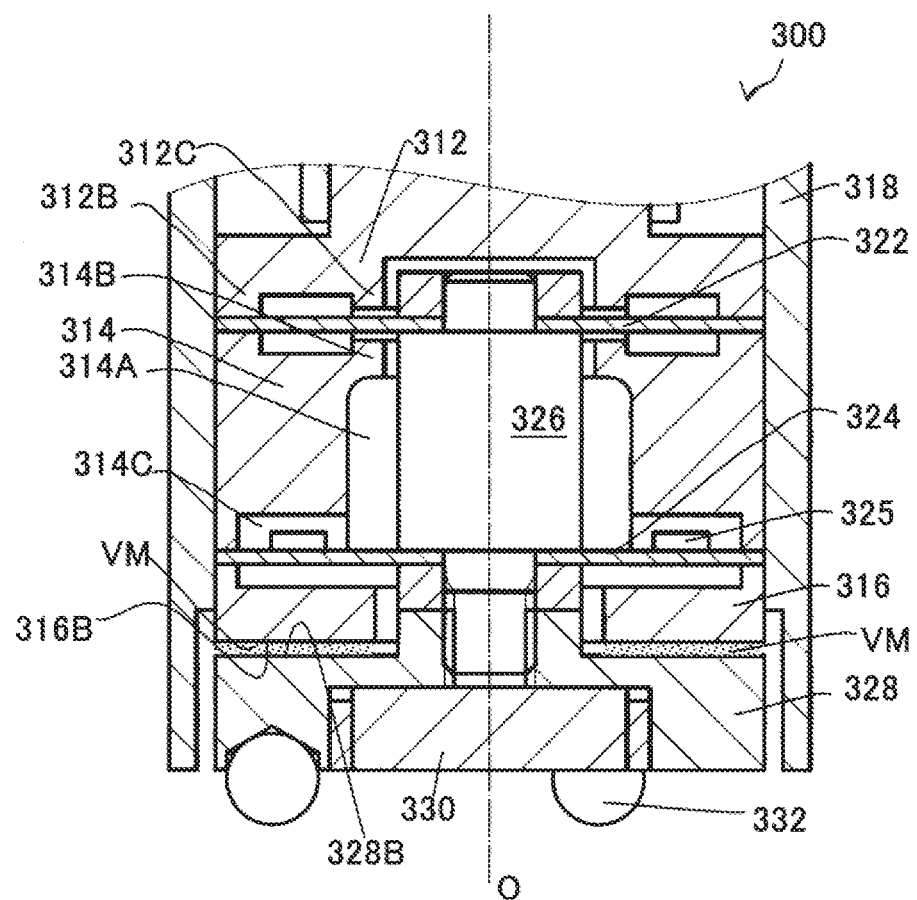
FIG. 3 is a schematic diagram illustrating part of the cross section of the measuring probe of FIG. 2.

As illustrated in FIGS. 2 and 3, the fixing member 314 is fixed to a lower end peripheral part 312B of the lower flange 312 via the supporting member 322. The fixing member 314 has a cylindrical shape provided with an opening 314A on the axial center O. Note that facing parts 312C and 314B are provided on the radially inner side of the lower end peripheral part 312B in the lower flange 312 and on the upper end side of the inner circumference of the fixing member 314, respectively. The facing parts 312C and 314B face both surfaces of the supporting member 322 without contact (i.e., the facing parts 312C and 314B that face the both surfaces of the supporting member 322 are provided integrally with the probe housing 306). A distance between the facing parts 312C and 314B and the supporting member 322 is determined so that a displacement of the supporting member 322 is regulated to fall within the range of elastic deformation.

Four recesses 314C are provided on a lower end inner surface of the fixing member 314 with fourfold symmetry. The bottom member 316 is fixed to a lower end peripheral portion of the fixing member 314 via the supporting member 324 interposed therebetween. In other words, as illustrated in FIG. 2, the bottom member 316 is configured to be positioned on the side closer to the stylus 336 with respect to all of the two supporting members 322 and 324, formed integrally with the probe housing 306, and disposed so as to face the flange member 328 for supporting the contact part 362. The bottom member 316 has an annular shape. The main body cover 318 has a cylindrical shape. The main body cover 318 is disposed over the outer peripheries of the circuit placement part 310, the lower flange 312, the fixing member 314, and the bottom member 316, so as to cover the whole of the signal processing circuit 320. The main body cover 318 is fixed to the fixing member 314 with bolts.

Figure 4:
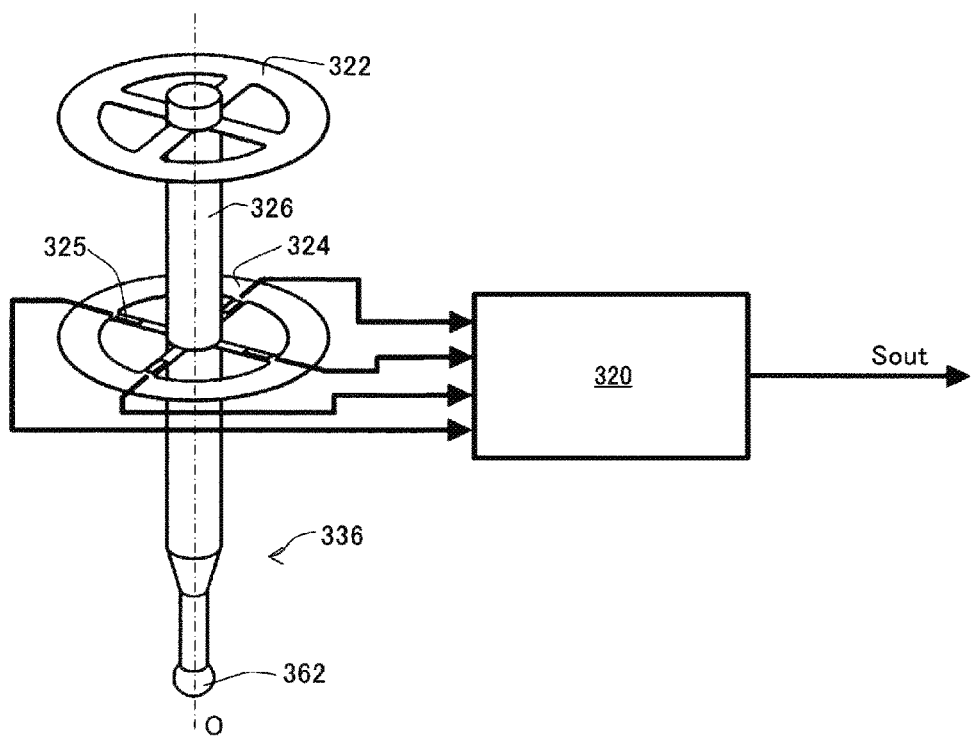
FIG. 4 is a block diagram illustrating a configuration of the measuring probe of FIG. 2.

As illustrated in FIG. 4, the signal processing circuit 320 is a circuit that processes the outputs of the detection elements 325 and outputs a touch signal (contact sensed signal) Sout for notifying that the object W to be measured has been in contact with the contact part 362. In brief, the signal processing circuit 320 is configured to obtain deflection amounts in the three X, Y, and Z directions from the outputs of the four detection elements 325, combine the deflection amounts in the three directions, and output the touch signal Sout when the contact part 362 has a certain displacement or greater (i.e., the measuring probe 300 works as a touch signal probe). Note that the signal processing circuit 320 may be provided with a temperature sensor so that a measurement error of the measuring probe 300 generated due to heat is corrected in accordance with the output of the temperature sensor. The signal processing circuit 320 may be configured with three circuit boards electrically connected to one another with a flexible printed wiring board, for example.

As illustrated in FIGS. 2 and 3, the supporting members 322 and 324 are elastically-deformable members to allow for attitude changes of the stylus 336 and disposed in the axial direction θ of the probe housing 306. A stainless steel material, for example, may be used (other materials may be used) for the supporting members 322 and 324. Specifically, each of the supporting members 322 and 324 has a rotationally symmetric shape including the total of four deformable arm parts at positions shifted from one another by an angle of 90 degrees in the circumferential direction thereof (around the axial center O), as illustrated in FIG. 4. These four arm parts are formed on the same plane. The supporting members 322 and 324 have the same thickness and the same structures except that widths of their arm parts are different from each other (without being limited thereto, the supporting members 322 and 324 may have arm part thicknesses, lengths, and shapes different from each other, or the entire supporting members 322 and 324 may have shapes different from each other). For this reason, the supporting member 324 in which the detection elements 325 are disposed will be described below and a description overlapping with that for the supporting member 322 will be omitted. Note that the structures of the supporting members are not limited to the shapes illustrated in the present embodiment.

Figure 5:
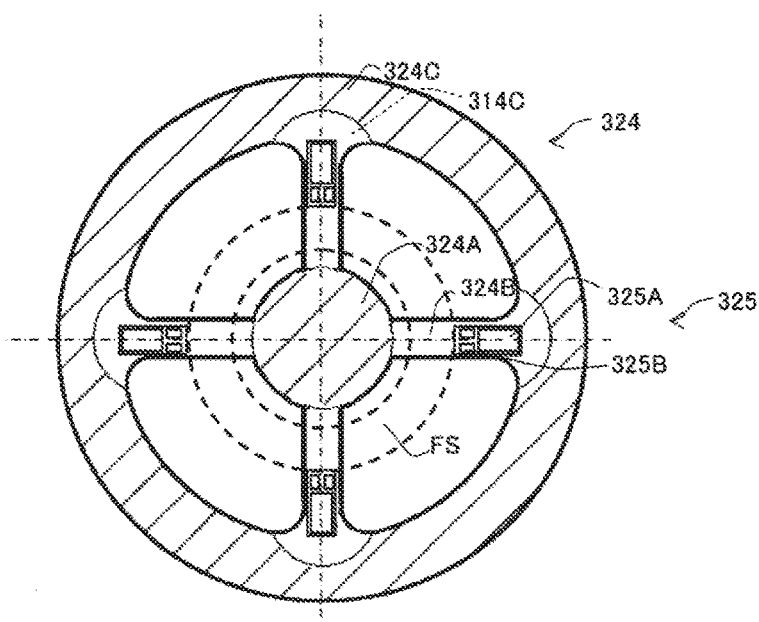
FIG. 5 is a schematic diagram illustrating an example of a supporting member and detection elements used in the measuring probe of FIG. 2.

As illustrated in FIG. 5, the supporting member 324 is a generally circular plate-shaped member including, in addition to rectangular arm parts 324B, a central part 324A connected to the coupling shaft 326, and a peripheral part 324C coupled to the central part 324A with the arm parts 324B and connected to the probe housing 306. The peripheral part 324C is positioned in the outermost portion of the supporting member 324. The arm part 324B extends linearly in a radial direction, and is disposed on the inner side of the peripheral part 324C. The central part 324A is disposed on the further inner side of the arm parts 324B. The supporting member 324 is configured in such a manner that the central part 324A moves vertically and horizontally by a displacement of the coupling shaft 326 with respect to the probe housing 306 and the arm parts 324B elastically deform accordingly. Note that the hatched portion of the central part 324A is a portion to be in contact with the coupling shaft 326. Also, the hatched portion of the peripheral part 324C is a portion to be in contact with the fixing member 314 of the probe housing 306.

As illustrated in FIG. 5, the detection element 325 is an affixed type strain gauge, for example, including: a detection part 325A for detecting a strain amount of the supporting member 324 in which the detection element 325 is disposed; and a terminal part 325B for taking out the signal of the detection part 325A to the outside. The detection elements 325 are disposed on, and fixed to, for example, with an adhesive, the respective arm part 324B of the supporting member 324. In the supporting member 324, when the contact part 362 is displaced in an XY direction, the arm part 324B strains uniformly in the radial direction. When the contact part 362 is displaced in the Z direction, however, the arm part 324B has larger strains in the vicinity of the central part 324A and in the vicinity of the peripheral part 324C. Here, the aforementioned recesses 314C are provided in the fixing member 314 so as to correspond to the vicinities of the peripheral parts 324C in the arm parts 324B. Accordingly, the detection elements 325 are each disposed on the side of the peripheral part 324C with respect to the center of the arm part 324B without being in contact with the fixing member 314. The detection part 325A is disposed on the side of the peripheral part 324C with respect to the center of the arm part 324B, and the terminal part 325B is disposed closer to the center of the arm part 324B than the detection part 325A. Accordingly, the terminal part 325B can be easily electrically connected to an annular flexible substrate FS illustrated with broken lines in FIG. 5. Note that the flexible substrate FS is disposed in a floated manner (in a manner not in contact with the arms) in a radial cavity between the fixing member 314 and the coupling shaft 326, for example.

As illustrated in FIGS. 2 and 3, the coupling shaft 326 has a generally cylindrical shape and couples the two supporting members 322 and 324 together. The coupling shaft 326 is held on the axial center O by the two supporting members 322 and 324 so as not to be in contact with the lower flange 312, the fixing member 314, and the bottom member 316. The coupling shaft 326 integrally supports the flange member 328.

As illustrated in FIGS. 2 and 3, the flange member 328 has a generally disk shape. The flange member 328 faces the bottom member 316 in the axial direction O without contact and faces the main body cover 318 in the radial direction without contact. The flange member 328 supports the stylus module 304 (i.e., the flange member 328 is a member for supporting the contact part 362, and the stylus 336 is configured to be displaceable integrally with the coupling shaft 326 with respect to the probe housing 306). Here, a viscous material VM, such as a grease oil, is filled in at least part of a gap between a facing surface 316B of the bottom member 316 and a facing surface 328B of the flange member 328. The words "be filled" as used herein mean that the viscous material VM is completely filled in between the bottom member 316 and the flange member 328 in the XY direction at at least one location (not necessarily required to be filled axisymmetrically). This allows at least the viscous material VM to damp a displacement of the flange member 328 with respect to the bottom member 316. Thus, the occurrence of unwanted vibrations in the XY direction and the Z direction generated along with a movement of the measuring probe 300 can be reduced, thereby preventing an increase in noise associated with an increase in sensitivity of the measuring probe 300. The permanent magnet 330 is fixed to the lower surface of the flange member 328 on the axial center O. The three balls 332 are disposed with rotational symmetry at intervals of 120 degrees in the circumferential direction on a lower end periphery of the flange member 328 so as to surround the permanent magnet 330.

As illustrated in FIG. 2, the aforementioned stylus module 304 includes an over-travel mechanism 334 and the stylus 336 supported by the over-travel mechanism 334 (i.e., the over-travel mechanism 334 is provided between the stylus 336 and the two supporting members 322 and 324 in the axial direction O). Note that the stiffness of the members (the coupling shaft 326, the flange member 328, the over-travel mechanism 334, and the stylus 336) supported by the two supporting members 322 and 324 and integrally having the contact part 362 at the tip thereof is set higher than the stiffness of the supporting member 324 in the direction perpendicular to the axial direction O in the present embodiment.

As illustrated in FIG. 2, the over-travel mechanism 334 is a mechanism that changes the position of the stylus 336 when a force larger than a measuring force F (predetermined measuring force) upon outputting the touch signal Sout is applied to the stylus 336 and restores the position of the stylus 336 automatically when such a large force disappears. In other words, the over-travel mechanism 334 works to change the position of the stylus 336 upon the application of a large force to the stylus 336 before the stylus module 304 comes off from the probe main body 302. Specifically, the over-travel mechanism 334 includes a flange part 338, an extended part 344, a stylus holder 346, and a coil spring 350.

As illustrated in FIG. 2, the flange part 338 is a member corresponding to the flange member 328. More specifically, the flange part 338 is provided with three V-grooves 340 at intervals of 120 degrees in the circumferential direction of the flange portion 338 so as to be in contact with the balls 332. A magnetic member (which may be a permanent magnet) 342 attracted to the permanent magnet 330 is disposed in the flange part 338 so as to face the permanent magnet 330.

Here, the V-grooves 340 are each to be in contact with the surface of the corresponding ball 332 as illustrated in FIG. 2. Thus, when the permanent magnet 330 and the magnetic member 342 are being attracted to each other by a predetermined magnetic force, the flange part 338 is seated on (in contact with) the flange member 328 at six points. In other words, the flange member 328 and the flange portion 338 can be coupled to each other while achieving high positioning accuracy. More specifically, the flange portion 338 and the flange member 328 constitute a kinematic joint (referred to also as a kinematic coupling; the same applies hereinafter), which is a coupling mechanism wherein they can be detached from and attached to each other. This kinematic joint allows for the achievement of high positioning reproducibility even when the probe main body 302 and the stylus module 304 are repeatedly detached from and attached to each other. Note that the kinematic joint is not limited to the combination of the V-groove and the ball, but may be a combination of a pair of rollers and a ball. Alternatively, the combination of the V-groove and the ball with the opposite arrangement may be employed. In other words, the kinematic joint is not limited to the combination of the V-groove and the ball as long as the six-point seating can be achieved (the same applies to the following kinematic joint). Note that the stylus module 304 can drop off from the flange member 328 (including not only a case when the balls 332 are not in contact with all of the V-grooves 340 but also a case when only part of the balls 332 is not in contact with the V-grooves 340; the same applies hereinafter) when a large force is applied to the stylus 336 from the horizontal direction (the direction perpendicular to the axial direction O), thereby preventing the breakage of the probe main body 302 (thus, the predetermined magnetic force by which the permanent magnet 330 and the magnetic member 342 are attracted to each other is a force corresponding to the aforementioned large force; the same applies hereinafter).

As illustrated in FIG. 2, the extended part 344 is formed integrally with the outer periphery of the flange part 338. The extended part 344 houses the coil spring 350 capable of expanding and contracting in the axial direction θ therein. The stylus holder 346 is provided at an end of the extended portion 344 in the axial direction O. The stylus holder 346 is connected to the extended part 344 with bolts. The upper surface of the stylus holder 346 closer to the coil spring 350 movably supports the flange part 356 of the stylus 336 pressed by the coil spring 350. Three balls 348 are disposed on the upper surface of the stylus holder 346 closer to the coil spring 350 at intervals of 120 degrees in the circumferential direction thereof. Three V-grooves 358 are provided on the lower surface of the flange part 356 at intervals of 120 degrees in the circumferential direction thereof so as to correspond to the balls 348. Note that an axial direction of the V-groove 358 is approximately the same as the radial direction toward the axial center O. In other words, it can be said that the stylus holder 346 and the flange part 356 constitute the aforementioned kinematic joint.

Thus, when the flange part 356 is being pressed by the coil spring 350 with a predetermined spring force, the flange part 356 is seated on (in contact with) the stylus holder 346 at six points. This allows for positioning at the fixed position. In other words, the over-travel mechanism 334 can achieve the highly-reproducible positioning of the stylus 336 with respect to the flange part 338 within a range of the measuring force F not greater than the pressing force of the coil spring 350. When a force larger than the predetermined spring force given by the coil spring 350 is applied to the stylus 336, the flange part 356 can be removed off from the stylus holder 346, thereby preventing the dropping off of the stylus module 304 from the probe main body 302. While the facing parts 312C and 314B in the present embodiment always allow the supporting member 322 to fall within the range of elastic deformation, the predetermined spring force given by the coil spring 350 is preferably set smaller than the measuring force F exceeding the range of elastic deformation of the supporting members 322 and 324.

As illustrated in FIG. 2, the stylus 336 includes: the flange part 356 supported by the stylus holder 346 as described above; a rod part 360 extending from the flange part 356 in the axial direction O; and the contact part 362 provided at the tip of the rod part 360.

As illustrated in FIG. 2, the base end of the rod part 360 is attached to the flange part 356. The tip of the rod part 360 is provided with the spherical contact part 362 to be brought into contact with the object W to be measured (i.e., the stylus 336 includes the contact part 362 to be brought into contact with the object W to be measured). Note that when no displacement of the stylus 336 in the XY direction occurs, the direction of the central axis of the stylus 336 coincides with the Z direction (the axial direction O).

Next, a rotational center position RC will be described next with reference to FIGS. 6A and 6B. Note that FIGS. 6A and 6B are schematic diagrams of the measuring probe 300 focusing on the relationship between the supporting members 322 and 324 and the stylus 336. Note that the reference numeral Dc denotes a compression strain, and the reference numeral De denotes a tensile strain.

The rotational center position RC is substantially determined by a stiffness ratio between the supporting member 322 and the supporting member 324. Here, the width of the arm part in the supporting member 322 is set larger than the width of the arm part 324B in the supporting member 324 as illustrated in FIG. 4. Thus, the stiffness of the supporting member 324 is lower than the stiffness of the supporting member 322. In other words, in a state in which no measuring force F is applied to the contact part 362 (FIG. 6A), the rotational center position RC of rotation generated in the stylus 336, when the measuring force F is applied to the contact part 362 from the direction perpendicular to the axial direction O, is positioned closer to the supporting member 322 than the supporting member 324 in the axial direction O (i.e., the supporting member 324 of the two supporting members 322 and 324 is disposed farthest away from the rotational center position RC and the detection elements 325 are disposed in the supporting member 324; and the supporting member 324 of the two supporting members 322 and 324 is disposed closest to the contact part 362). Note that the structures of the supporting members are not limited to the shapes illustrated in the present embodiment. While the rotational center position RC may be obtained uniquely by the stiffness ratio between the supporting member 322 and the supporting member 324, the rotational center position RC may be obtained in consideration of the bend of the stylus 336.

As just described, the stiffness of the supporting member 324 is set lower than the stiffness of the supporting member 322 in the present embodiment, so that the supporting member 324 of the two supporting members 322 and 324 is disposed farthest away from the rotational center position RC. The detection elements 325 are disposed on such a supporting member 324. This causes a larger strain in the detection element 325, thus allowing for high sensitivity detection. Note that the present invention is not limited thereto. The rotational center position RC may not be determined by a stiffness difference between the two supporting members. Alternatively, not two but three or more supporting members may be used.

In the present embodiment, the stylus 336 is displaceable integrally with the coupling shaft 326 with respect to the probe housing 306. This results in a reduced volume of the member formed integrally with the stylus 336, thereby achieving a high resonance frequency and thus achieving high-speed measurement.

In the present embodiment, stiffness of the measuring probe 300 in the axial direction O and stiffness of the measuring probe 300 in the direction perpendicular to the axial direction O can be made identical with each other. For example, it can be achieved by adjusting the stiffness of the supporting member 322 in the Z direction and the stiffness of the supporting member 324 in the X and Y directions with respect to each other. In this case, the same deflection amounts can be easily obtained by the same force in all of the three X, Y, and Z directions. Thus, the same measuring force F can be exerted in all of the directions and the same deflection amounts can be thereby obtained. In other words, displacements upon outputting the touch signal Sout can be made the same regardless of their directions, thereby easily preventing measurement results from having directional dependency. At the same time, measurement results of the objects to be measured, made of materials each having different stiffness can be directly compared to each other by adjusting the output threshold of the touch signal Sout. For example, a mock-up made of a resin and a mass-produced molded product made of a metal can be compared to each other. Without being limited thereto, stiffness in the axial direction O and stiffness in the direction perpendicular to the axial direction O may be different from each other in each of the two supporting members.

In the present embodiment, the stiffness of the members (the coupling shaft 326, the flange member 328, the over-travel mechanism 334, and the stylus 336) supported by the two supporting members 322 and 324 and integrally having the contact part 362 on the tip thereof is set higher than the stiffness of the supporting member 324 that is farthest away from the rotational center position RC, in the direction perpendicular to the axial direction θ. Thus, the deflection of the supporting member 324 is larger than the deflection of the stylus 336, resulting in a larger detection amount in the detection element 325 with respect to a displacement of the stylus 336. In other words, a measurement can be performed with higher sensitivity. Without being limited thereto, the stiffness of the members supported by the two supporting members and formed integrally up to the contact part may be set lower than the stiffness of the supporting member disposed farthest away from the rotational center position RC, in the direction perpendicular to the axial direction O.

In the present embodiment, the supporting member 324 of the two supporting members 322 and 324 that is farthest away from the rotational center position RC is disposed closest to the contact part 362. In other words, the detection elements 325 are disposed closer to the stylus than the rotational center position RC. Thus, detection errors can be reduced, and a reduction of noise and an increase in sensitivity can be achieved.

In the present embodiment, the two supporting members 322 and 324 each have the rotationally symmetric shape including the four deformable arm parts, and the four arm parts are formed on the same plane. This easily allows for separation into X, Y, and Z three axis components in the signal processing of the output signals from the detection elements 325 and sensitivity around the axis of the stylus 336 can be made isotropic, as compared to a case having three arms. At the same time, the arm parts supporting the stylus 336 press each other since the arm parts are on the same plane. Thus, a degree of descent of the contact part 362 when the measuring probe 300 is oriented in the horizontal direction can be reduced. Without being limited thereto, the supporting member may have a rotationally symmetric shape including three or more deformable arms. Such a rotationally symmetric shape can facilitate the arithmetic operations of the outputs of the detection elements correspondingly. However, the supporting member may not include three or more deformable arm parts, and the arm parts may not be formed on the same plane. Needless to say, the number of the arm parts may differ between the two supporting members. Alternatively, only at least the supporting member that supports the detection elements may include arm parts in a multiple of four. In this case, strains in the three X, Y, and Z directions can be easily separated and calculated.

In the present embodiment, the detection element 325 is disposed on the side of the peripheral part with respect to the center of the arm part 324B. Strain in the arm part 324B is not entirely uniform. Especially when the contact part 362 moves in the axial direction O, large strains are generated between the end of the arm part 324B connected to the peripheral part 324C and the end thereof connected to the central part 324A. Although both the peripheral part 324C and the central part 324A need to be supported securely, the supported area of the peripheral part 324C is large unlike the central part 324A. Thus, even a reduction in the portion of (the fixing member 314 of) the probe housing 306 that supports the peripheral part 324C by forming the recesses 314C is less likely to affect the force for fixing the supporting member 324. In other words, the arrangement of the detection elements 325 in the present embodiment can stably ensure the supporting of the stylus 336 by the supporting member 324, and strain in the arm part 324B can be effectively detected. Without being limited thereto, the detection element may be disposed so as to cover the entire arm part or may be disposed closer to the center of the arm part.

In the present embodiment, the terminal part 325B of the detection element 325 is disposed closer to the center of the arm part 324B than the detection part 325A of the detection element 325. This allows a wiring board connected to the terminal part 325B and reaching the signal processing circuit 320 to be disposed in the cavity between the fixing member 314 and the coupling shaft 326 in the radial direction. Therefore, the size of the probe housing 306 and the size of the coupling shaft 326 can be optimized without paying attention to wiring for obtaining outputs from the detection elements 325. Without being limited thereto, the terminal part of the detection element may be disposed closer to the peripheral part than the detection part of the detection element.

In the present embodiment, the signal processing circuit 320 is disposed on the side opposite to the stylus 336 with respect to all of the two supporting members 322 and 324. This can reduce the distance between the supporting members 322 and 324. Thus, the members (the circuit placement part 310 and the lower flange 312) for supporting the signal processing circuit 320 can have a light weight but high stiffness. At the same time, heat generated in the signal processing circuit 320 can be easily made less likely to be conducted not only to the supporting members 322 and 324 but also to the stylus 336. In other words, high accuracy and high stabilization can be achieved in the output of the touch signal Sout, as compared to a case where the signal processing circuit is disposed between the supporting members. Without being limited thereto, the signal processing circuit may not be disposed on the side opposite to the stylus 336 with respect to all of the two supporting members.

In the present embodiment, the over-travel mechanism 334 is provided between the stylus 336 and the two supporting members 322 and 324 in the axial direction O. This can achieve a quick measurement while preventing an excessive force from being directly applied to the two supporting members 322 and 324. In particular, since the over-travel mechanism 334 is provided in the stylus module 304, it is possible to reduce such malfunction that the stylus module 304 is disengaged from the probe main body 302 before the over-travel mechanism 334 works. Without being limited thereto, the over-travel mechanism 334 may not be disposed between the stylus and the two supporting members. The measuring probe 300 can then reduce its weight accordingly.

In the present embodiment, the facing parts 312C and 314B, which face the both surfaces of the supporting member 322 of the two supporting members 322 and 324, are provided integrally with the probe housing 306. This can reliably limit a displacement of the supporting member 322 within the range of elastic deformation. At the same time, this can prevent the breakage and deformation of the supporting member 324. Without being limited thereto, such facing parts may be provided with respect to all of the supporting members or no facing parts may be provided.

In the present embodiment, the viscous material VM is filled in at least part of the gap between the bottom member 316 and the flange member 328, where the bottom member 316 is positioned on the side closer to the stylus 336 with respect to all of the two supporting members 322 and 324, formed integrally with the probe housing 306, and disposed so as to face the flange member 328 for supporting the contact part 362. This allows for the damping of a displacement of the stylus 336, thereby reducing output malfunction when the stylus 336 is moved. Moreover, the position at which the viscous material VM is filled is external to the two supporting members 322 and 324. This allows the viscous material VM to be filled and the filling amount of the viscous material VM to be changed and adjusted, without removing the supporting members 322 and 324, etc. In other words, the existence of a step of filling the viscous material VM does not make the manufacturing process of the measuring probe 300 to be complicated. Additionally, damping characteristics can be easily adjusted since refilling of the viscous material VM can be easily performed even after the manufacturing of the measuring probe 300. At the same time, since the viscous material VM is filled between the bottom member 316 and the flange member 328 and its position is therefore away from the circuit placement part 310, there is no possibility for the viscous material VM to adhere to and thereby contaminate the signal processing circuit 320 even if the viscous material VM scatters. Without being limited thereto, the position at which the viscous material VM is filled may not be on the side closer to the stylus with respect to all of the two supporting members, or no viscous material VM may be filled. Alternatively, rubber (an elastic material) such as silicone may be used instead of the viscous material VM. In this case, damping can be performed without concerning about scattering as in the viscous material VM.

In the present embodiment, the detection element 325 is an affixed type strain gauge. In other words, a highly-sensitive and low-cost detection element can be used as the detection element 325. Moreover, the position at which the detection element 325 is affixed can be easily adjusted. The detection element 325 does not detect a transient impact force only but can send an output corresponding to the deflection amount stably for a certain period of time. This can eliminate a need to provide a circuit for performing temporal adjustments even if output timing for the deflection amounts in the three X, Y, and Z directions is shifted from one another in the detection elements 325. Without being limited thereto, the detection element may be a strain gauge or PZT, for example, formed on the arm part by means of direct deposition, for example.

In other words, a simple structure but high measurement sensitivity can be ensured in the present embodiment.

While the present invention has been described taking the first embodiment as an example, the present invention is not limited to the first embodiment. In other words, modifications and design alterations are obviously possible without departing from the scope of the present invention.

Figure 7A:
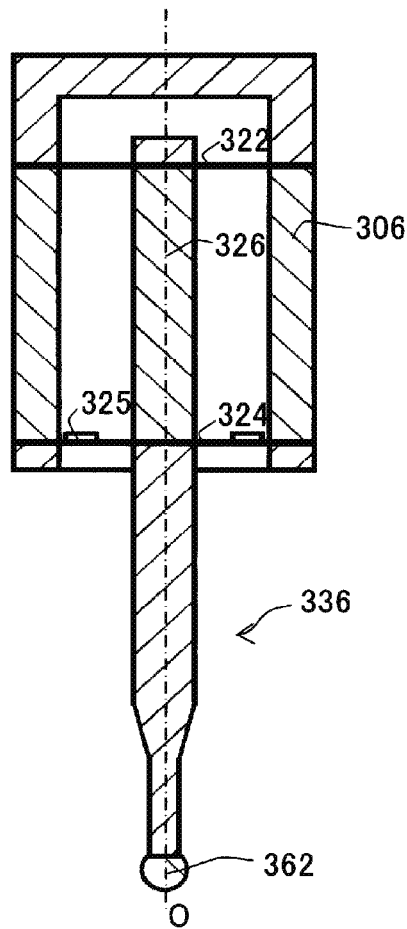
FIG. 7A is a general cross-sectional diagram of the measuring probe according to the first embodiment of the present invention.
Figure 7B:
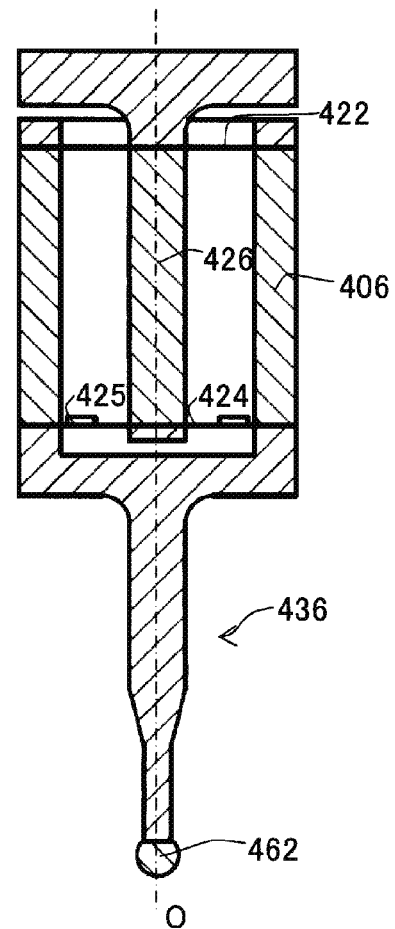
FIG. 7B is a general cross-sectional diagram of a measuring probe according to a second embodiment of the present invention.

For example, the stylus 336 is configured to be displaceable integrally with the coupling shaft 326 with respect to the probe housing 306 in the first embodiment. However, the present invention is not limited thereto. For example, the measuring probe may be configured as in the second embodiment illustrated in FIG. 7B. The second embodiment is different from the first embodiment only in connection relationships among the probe housing, the coupling shaft, and the stylus. Accordingly, a general cross-sectional diagram illustrating only such a portion is illustrated in FIG. 7B, and a description about other configurations will be omitted. Note that a general cross-sectional diagram in FIG. 7A shows the first embodiment.

In the second embodiment, a stylus 436 is configured to be displaceable integrally with a probe housing 406 with respect to a coupling shaft 426 as illustrated in FIG. 7B. In other words, the coupling shaft 426 is fixedly supported by a spindle, and the stylus 436 formed integrally with the probe housing 406 is configured to be displaceable with respect to the coupling shaft 426 by supporting members 422 and 424. This can reduce the resonance frequency of the stylus 436 and thus can easily cut vibration noise.

In the first embodiment, the supporting member 324 (on which the detection elements 325 are disposed) of the two supporting members 322 and 324 that is farthest away from the rotational center position RC is disposed closest to the contact part 362. However, the present invention is not limited thereto. For example, the measuring probe may be configured as in the third embodiment illustrated in FIG. 8A. The third embodiment is different from the first embodiment only in the position of the supporting member on which the detection elements are disposed. Accordingly, a schematic diagram illustrating only such a portion is illustrated in FIG. 8A, and a description about other configurations will be omitted.

Figure 8A:
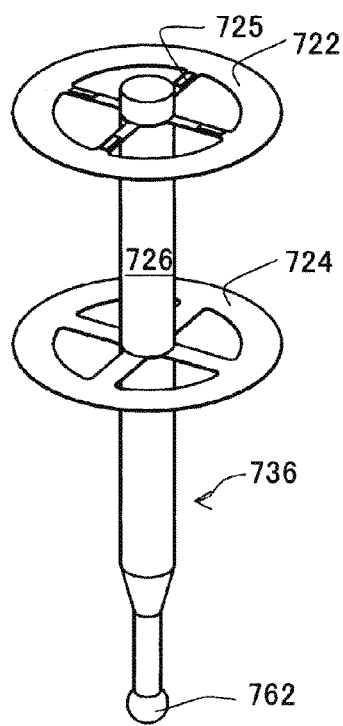
FIG. 8A is a schematic diagram of a measuring probe according to a third embodiment of the present invention having detection elements at different positions.

In the third embodiment, of two supporting members 722 and 724, the width of an arm part in the supporting member 722 is set smaller than the width of an arm part in the supporting member 724 as illustrated in FIG. 8A. Consequently, the rotational center position RC is positioned closer to the supporting member 724, and the supporting member 722 is positioned farthest away from the rotational center position RC. Detection elements 725 are disposed on the supporting member 722. In other words, the supporting member 722 (on which the detection elements 725 are disposed) of the two supporting members 722 and 724 that is farthest away from the rotational center position RC is disposed farthest away from a contact part 762. This can reduce sudden strain transmitted to the detection element 725, thus reducing the possibility of false detection such as vibration noise. Without being limited thereto, the detection elements may, of course, be disposed in each of the two supporting members. In such a case, the use of outputs from a large number of detection elements can increase the sensitivity of the measuring probe and improve the noise resistance thereof.

While the shape of the arm part on which the detection element is disposed has constant width in its radial direction with no features in the first embodiment, the present invention is not limited thereto. For example, the measuring probe may be configured as in the fourth embodiment illustrated in FIG. 8B. The fourth embodiment is different from the first embodiment only in the shape of the arm on which the detection element is disposed. Accordingly, a schematic diagram of a supporting member capable of recognizing the shape of such an arm is illustrated in FIG. 8B, and a description about other configurations will be omitted.

Figure 8B:
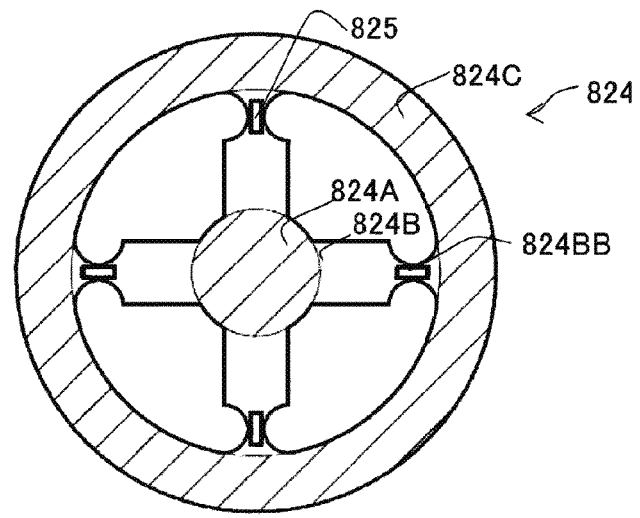
FIG. 8B is a schematic diagram of a measuring probe according to a fourth embodiment of the present invention having a differently-shaped supporting member.

In the fourth embodiment, an arm part 824B of a supporting member 824 on which a detection element 825 is disposed includes, on the side of the peripheral part 824C, a narrowed portion 824BB having a width smaller than a width on the side of the central part 824A, as illustrated in FIG. 8B. This allows strain to be concentrated on the narrowed portion 824BB. Thus, the strain can be detected with high sensitivity and with high accuracy by the detection element 825 disposed in that narrowed portion 824BB.

While the measuring probe includes the signal processing circuit that outputs the touch signal Sout in the above embodiment, the present invention is not limited thereto. For example, the measuring probe may be a scanning probe including a signal processing circuit that outputs displacement signals in accordance with displacement amounts in the three X, Y, and Z directions.

The present invention can be applied broadly to measuring probes used for measuring three-dimensional shapes of objects to be measured. In doing so, the present invention can be applied not only to measuring probes for coordinate measuring machines but also to measuring probes used for machine tools.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

What is claimed is:

1. A measuring probe comprising:
a stylus having a contact part to be brought into contact with an object to be measured;
a probe housing capable of supporting the stylus on an axial center;
a detector capable of detecting a movement of the contact part;
a plurality of supports disposed at different positions in an axial direction of the probe housing, the supports allowing for an attitude change of the stylus; and
a coupling shaft configured to couple the plurality of supports together, wherein
the detector is disposed in, among the plurality of supports, a support that is farthest away from a rotational center position of rotation generated in the stylus when a measuring force is applied to the contact part from a direction perpendicular to the axial direction, to detect a strain amount of the support.

2. The measuring probe according to claim 1, wherein the stylus is configured to be displaceable integrally with the coupling shaft with respect to the probe housing.

3. The measuring probe according to claim 1, wherein the stylus is configured to be displaceable integrally with the probe housing with respect to the coupling shaft.

4. The measuring probe according to claim 1, wherein stiffness of the measuring probe in the axial direction and stiffness of the measuring probe in the direction perpendicular to the axial direction are made identical with each other.

5. The measuring probe according to claim 1, wherein stiffness of the support that is farthest away from the rotational center position is set lower than stiffness of the remaining support.

6. The measuring probe according to claim 1, wherein stiffness of a contact part support that is supported by the plurality of supports and integrally has the contact part on a tip thereof is set higher than the stiffness of the support that is farthest away from the rotational center position, in the direction perpendicular to the axial direction.

7. The measuring probe according to claim 1, wherein the support that is farthest away from the rotational center position among the plurality of supports is disposed closest to the contact part.

8. The measuring probe according to claim 1, wherein the plurality of supports each have a rotationally symmetric shape including three or more deformable arm parts, and the three or more arm parts are provided on a same plane.

9. The measuring probe according to claim 8, wherein among the plurality of supports, at least a support that supports the detector is configured to include the arm parts in a multiple of four.

10. The measuring probe according to claim 8, wherein
the support that supports the detector includes, in addition to the arm part, a central part connected to the coupling shaft, and a peripheral part coupled to the central part with the arm part and connected to the probe housing, and
the detector is disposed on a side of the peripheral part with respect to a center of the arm part.

11. The measuring probe according to claim 10, wherein the arm part further includes, on the side of the peripheral part, a narrowed portion having a width smaller than a width on a side of the central part.

12. The measuring probe according to claim 10, wherein a terminal part of the detector is disposed closer to the center of the arm part than a detection part of the-detector.

13. The measuring probe according to claim 1, wherein a signal processing circuit for processing an output of the detector is disposed on a side opposite to the stylus with respect to all of the plurality of supports.

14. The measuring probe according to claim 1, comprising an over-travel mechanism for changing a position of the stylus when a force larger than a predetermined measuring force is applied to the stylus and restoring the position of the stylus automatically when the large force disappears, the over-travel mechanism being provided between the plurality of supports and the stylus in the axial direction.

15. The measuring probe according to claim 1, wherein facing parts that face the both surfaces of at least one support among the plurality of supports are provided integrally with the probe housing.

16. The measuring probe according to claim 1, wherein any of a viscous material and an elastic material is filled in at least part of a gap between a contact part support that supports the contact part and a wall that is positioned on a side closer to the stylus with respect to all of the plurality of supports, provided integrally with the probe housing, and disposed so as to face the contact part support.

17. The measuring probe according to claim 1, wherein the detector is disposed in each of two or more of the supports.

18. The measuring probe according to claim 1, wherein the detector is a strain gauge.

19. The measuring probe according to claim 1, wherein the detector is disposed only on one support among the plurality of supports.

* * * * *